(12) United States Patent
Marcu et al.

(10) Patent No.: US 9,569,352 B2
(45) Date of Patent: Feb. 14, 2017

(54) STORAGE MODULE AND METHOD FOR REGULATING GARBAGE COLLECTION OPERATIONS BASED ON WRITE ACTIVITY OF A HOST

(71) Applicants: Alon Marcu, Tel Mond (IL); Amir Shaharabany, Kochav Yair (IL); Hadas Oshinsky, Kfar Saba (IL); Adir Moshen HaCohen, Sunnyvale, CA (US); Einav Pnina Zilberstein, Hod Hasharon (IL)

(72) Inventors: Alon Marcu, Tel Mond (IL); Amir Shaharabany, Kochav Yair (IL); Hadas Oshinsky, Kfar Saba (IL); Adir Moshen HaCohen, Sunnyvale, CA (US); Einav Pnina Zilberstein, Hod Hasharon (IL)

(73) Assignee: SanDisk Technologies LLC, Plano, TX (US)

( * ) Notice: Subject to any disclaimer, the term of this patent is extended or adjusted under 35 U.S.C. 154(b) by 124 days.

(21) Appl. No.: 13/829,010

(22) Filed: Mar. 14, 2013

(65) Prior Publication Data
US 2014/0281127 A1    Sep. 18, 2014

(51) Int. Cl.
G06F 12/00      (2006.01)
G06F 12/02      (2006.01)

(52) U.S. Cl.
CPC ....... *G06F 12/0246* (2013.01); *G06F 12/0238* (2013.01); *G06F 2212/1024* (2013.01); *G06F 2212/7205* (2013.01)

(58) Field of Classification Search
CPC ... G06F 12/0246; G06F 3/0679; G11C 16/102
USPC ........................................... 711/103
See application file for complete search history.

(56) References Cited

U.S. PATENT DOCUMENTS

| | | | |
|---|---|---|---|
| 5,948,081 A | 9/1999 | Foster | |
| 6,615,308 B1 | 9/2003 | Fanning | |
| 8,187,936 B2 | 5/2012 | Alsmeier et al. | |
| 2003/0093633 A1 | 5/2003 | Thiesfeld et al. | |

(Continued)

FOREIGN PATENT DOCUMENTS

EP     0 374 764 A2    6/1990

OTHER PUBLICATIONS

"Write Amplification," http://en.wikipedia.org/wiki/Write_amplication, 13 pages, printed Mar. 9, 2013.

(Continued)

*Primary Examiner* — Charles Rones
*Assistant Examiner* — Nanci Wong
(74) *Attorney, Agent, or Firm* — Brinks Gilson & Lione

(57) ABSTRACT

A storage module and method for regulating garbage collection operations based on write activity of a host are disclosed. In one embodiment, a storage module determines whether the host is operating in a burst mode by determining whether write activity of the host over a time period exceeds a threshold. The write activity can comprise one or both of (i) an amount of data received from the host to be written in the storage module and (ii) a number of write commands received from the host. If the host is operating in the burst mode, the storage module limits an amount of garbage collection operations during the burst mode. When the host is no longer operating in the burst mode, the storage module increases an amount of garbage collection operations.

36 Claims, 4 Drawing Sheets

(56) References Cited

U.S. PATENT DOCUMENTS

| | | | |
|---|---|---|---|
| 2006/0083069 A1 | 4/2006 | Fasoli | |
| 2006/0123320 A1 | 6/2006 | Vogt | |
| 2007/0016725 A1 | 1/2007 | Chu et al. | |
| 2007/0055813 A1 | 3/2007 | Ingram et al. | |
| 2008/0270678 A1 | 10/2008 | Cornwell et al. | |
| 2009/0222639 A1 | 9/2009 | Hyvonen et al. | |
| 2010/0118434 A1 | 5/2010 | Inoue | |
| 2010/0191874 A1 | 7/2010 | Feeley et al. | |
| 2010/0262766 A1 | 10/2010 | Sprinkle et al. | |
| 2010/0287217 A1* | 11/2010 | Borchers et al. | 707/813 |
| 2012/0159051 A1 | 6/2012 | Hida et al. | |
| 2012/0254505 A1* | 10/2012 | Chishtie et al. | 711/103 |
| 2012/0254966 A1 | 10/2012 | Parker | |
| 2012/0311293 A1* | 12/2012 | Nemazie | G11C 16/0483 711/171 |
| 2013/0024641 A1* | 1/2013 | Talagala et al. | 711/170 |
| 2013/0031307 A1* | 1/2013 | Itoh | 711/113 |
| 2013/0054929 A1* | 2/2013 | Baik et al. | 711/170 |
| 2013/0246582 A1 | 9/2013 | Lee et al. | |
| 2013/0270643 A1 | 10/2013 | Lee et al. | |
| 2013/0282955 A1* | 10/2013 | Parker et al. | 711/103 |
| 2013/0305247 A1 | 11/2013 | Easton et al. | |
| 2014/0122774 A1* | 5/2014 | Xian et al. | 711/103 |

OTHER PUBLICATIONS

Office Action issued in U.S. Appl. No. 14/254,393, mailed Jun. 16, 2014, 18 pages.

Arya, P., "A Survey of 3D Nand Flash Memory", *EECS Int'l Graduate Program, National Chiao Tung University*, 2012, pp. 1-11.

Nowak, E. et al., "Intrinsic Fluctuations in Vertical NAND Flash Memories", *2012 Symposium on VLSI Technology Digest of Technical Papers*, 2012, pp. 21-22.

Application as Filed for U.S. Appl. No. 14/254,393 entitled, "Storage Module and Method for Adaptive Burst Mode", filed on Apr. 16, 2014, 31 pages.

Application as Filed for U.S. Appl. No. 14/133,979, filed Dec. 19, 2013, 121 pages.

Application as Filed for U.S. Appl. No. 14/136,103, filed Dec. 20, 2013, 56 pages.

Jang et al., "Vertical Cell Array using TCAT(Terabit Cell Array Transistor) Technology for Ultra High Density NAND Flash Memory," *2009 Symposium on VLSI Technology Digest of Technical Papers*, pp. 192-193, 2009.

Office Action issued in U.S. Appl. No. 14/254,393, dated Oct. 22, 2014, 18 pages.

Office Action for U.S. Appl. No. 14/254,393 dated May 5, 2015, 19 pages.

Office Action for U.S. Appl. No. 14/254,393 dated Mar. 28, 2016, 21 pages.

Invitation to Pay Fees for PCT/US2015/023337 dated Jun. 8, 2015, 5 pages.

International Search Report and Written Opinion for PCT/US2015/023337 dated Aug. 18, 2015, 12 pages.

Office Action for U.S. Appl. No. 14/254,393 dated Oct. 2, 2015, 21 pages.

\* cited by examiner

STORAGE MODULE AND METHOD FOR REGULATING GARBAGE COLLECTION OPERATIONS BASED ON WRITE ACTIVITY OF A HOST

BACKGROUND

Flash memory is typically written in units of blocks. In a given block, there are several pages of data. Over time, some of those pages may be marked as invalid, such as when an updated version of the data in a page is written to another block. Accordingly, at any given time, a given block may contain several pages of invalid data. Also, because flash memory is written in units of blocks, when a storage module want to write a page to an existing block, the storage module reads the pages previously-stored in the existing block and then writes those pages, as well as the new page, to another block in memory. Because some of the previously-stored pages may no longer be valid, the storage module determines which pages are still valid and only writes the valid pages to the new block. This process can be time consuming and can reduce the performance of the system.

To improve performance, a storage module can implement a management process known as garbage collection. With garbage collection, the storage module's controller uses its idle time to consolidate blocks of flash memory before the host needs to write new data. This improves system performance because the process of determining which pages are valid and then moving those pages occurs when the storage module is idle rather than when a user is awaiting a write operation. In theory, if the storage module controller were to collect all of the spare blocks before it was necessary, new data can be written from a host without having to move any data, resulting in optimum performance.

Several triggers can be used to start a garbage collection operation. For example, some storage modules use a fixed a-priori design for performing garbage collection. Other storage modules, such as solid state drives (SSD), use arbitrary benchmarks to trigger garbage collection. For example, some SSDs wait for a predetermined time of inactivity before starting a garbage collection operation. These predetermined times are based on the assumption that SSDs often have relatively long periods of inactivity (e.g., few minutes) between heavy periods of use. However, because these benchmarks are predetermined, it is possible that the storage module can receive an incoming command (e.g., from an external host) when a garbage collection operation is in process. In such a situation, the garbage collection operation is typically interrupted in order to execute the incoming command with minimal degradation to the user experience. However, the fact that the storage module is occupied with system maintenance while an incoming command is received is, by itself, a cause for additional latency and degradation in the user experience.

OVERVIEW

Embodiments of the present invention are defined by the claims, and nothing in this section should be taken as a limitation on those claims.

By way of introduction, the below embodiments relate to a storage module and method for regulating garbage collection operations based on write activity of a host. In one embodiment, a storage module determines whether the host is operating in a burst mode by determining whether write activity of the host over a time period exceeds a threshold. The write activity can comprise one or both of (i) an amount of data received from the host to be written in the storage module and (ii) a number of write commands received from the host. If the host is operating in the burst mode, the storage module limits an amount of garbage collection operations during the burst mode. When the host is no longer operating in the burst mode, the storage module increases an amount of garbage collection operations.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned above, if an incoming command is received while a storage module is performing a garbage collection operation, the garbage collection operation is typically interrupted, but the time needed for dealing with the process of interrupting the garbage collection operation can be a cause for latency and degradation in the user experience. While some prior storage modules, such as solid state drives, use predetermined benchmarks for triggering the start of a garbage collection operation (e.g., by waiting for a predetermined time of inactivity), such "synthetic" benchmarks may not comport with real-world situations. The following embodiments can be used to regulate garbage collection operations based on write activity of a host. By using actual write activity of the host, these embodiments can provide better performance as compared to prior storage modules that use synthetic benchmarks.

Before turning to these and other embodiments, the following section provides a discussion of an exemplary storage module that can be used with these embodiments. Of course, these are just examples, and other suitable types of storage modules can be used.

Figure 1:
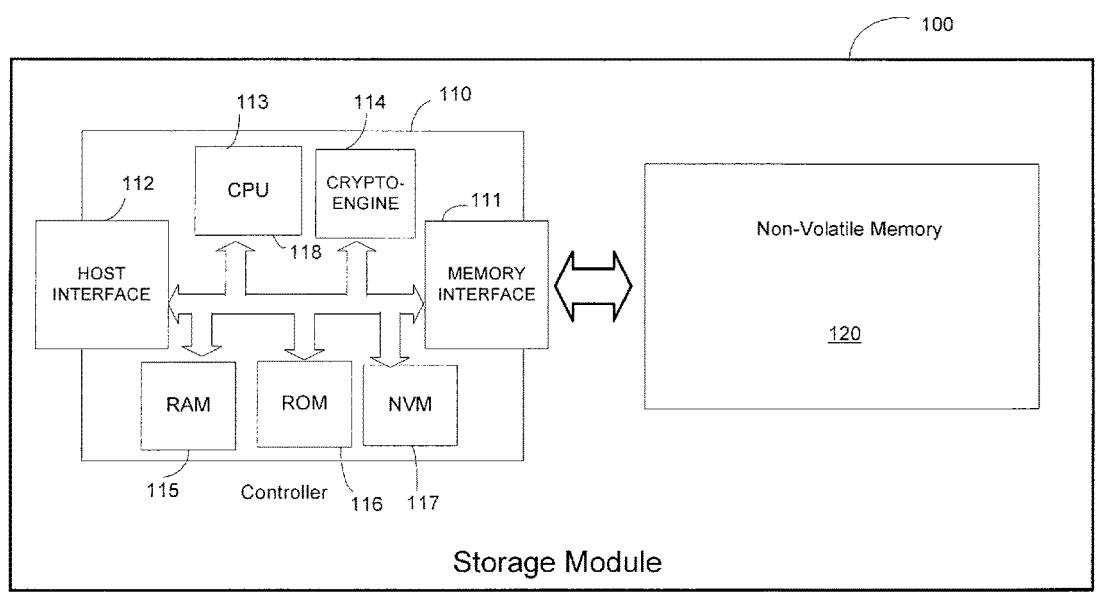
FIG. 1 is a block diagram of an exemplary storage module of an embodiment.

As illustrated in FIG. 1, a storage module 100 of one embodiment comprises a controller 110 and non-volatile memory 120. The controller 110 comprises a memory interface 111 for interfacing with the non-volatile memory 120 and a host interface 112 for placing the storage module 100 operatively in communication with a host. As used herein, the phrase "operatively in communication with" could mean directly in communication with or indirectly in communication with through one or more components, which may or may not be shown or described herein.

Figure 2A:
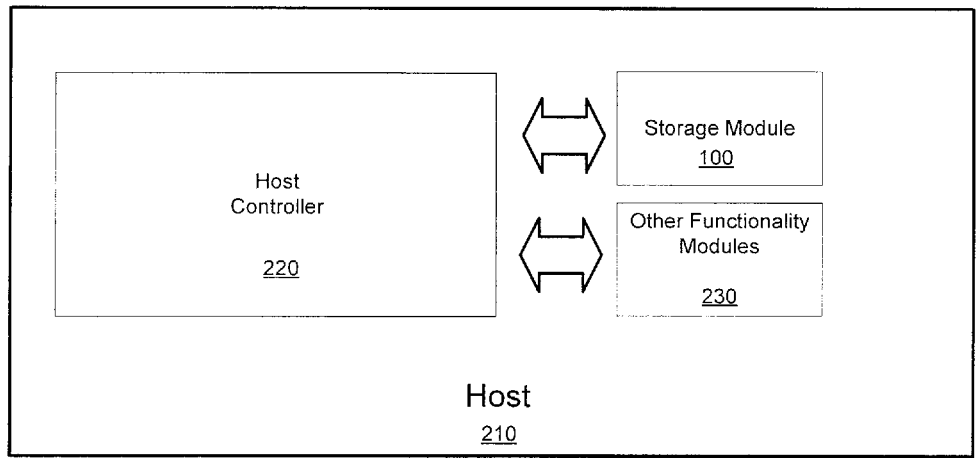
FIG. 2A is a block diagram of an electronic device of an embodiment, where the exemplary storage module of FIG. 1 is embedded in the electronic device.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation. The host controller 220 can interface with the embedded storage module 100 using, for example, an eMMC host interface or a UFS interface. The host 210 can take any form, such as, but not limited to, a solid state drive (SSD), a hybrid storage device (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing.

Figure 2B:
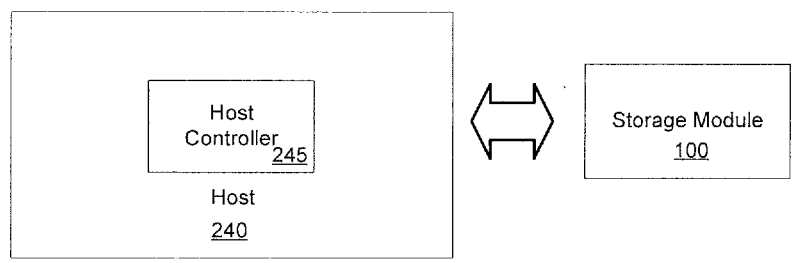
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the controller 110, and also conveys memory responses from the controller 110 to the host controller 220 (FIG. 2A) or host 240 (FIG. 2B). Also, it should be noted that when the storage module 110 is embedded in the host 210, some or all of the functions described herein as being performed by the controller 110 in the storage module 100 can instead be performed by the host controller 220.

Returning to FIG. 1, the controller 210 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The controller 110 can be implemented in any suitable manner. For example, the controller 110 can take the form of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller, for example. Suitable controllers can be obtained from Marvell or SandForce.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed.

With this exemplary storage module now described, the following section discusses various embodiments that can be used for regulating garbage collection operations based on write activity of a host.

As mentioned above, if an incoming command is received while a storage module is performing a garbage collection operation, the garbage collection operation is typically interrupted, but the time needed for dealing with the process of interrupting the garbage collection operation can be a cause for latency and degradation in the user experience. While some prior storage modules, such as solid state drives, use predetermined benchmarks for triggering the start of a garbage collection operation (e.g., waiting for a predetermined time of inactivity), such "synthetic" benchmarks may not comport with real-world situations. With the following embodiments, garbage collection operations are regulated based on the actual write activity of a host. By using actual write activity of the host, these embodiments can provide better performance as compared to prior storage modules that use synthetic benchmarks.

Figure 3:
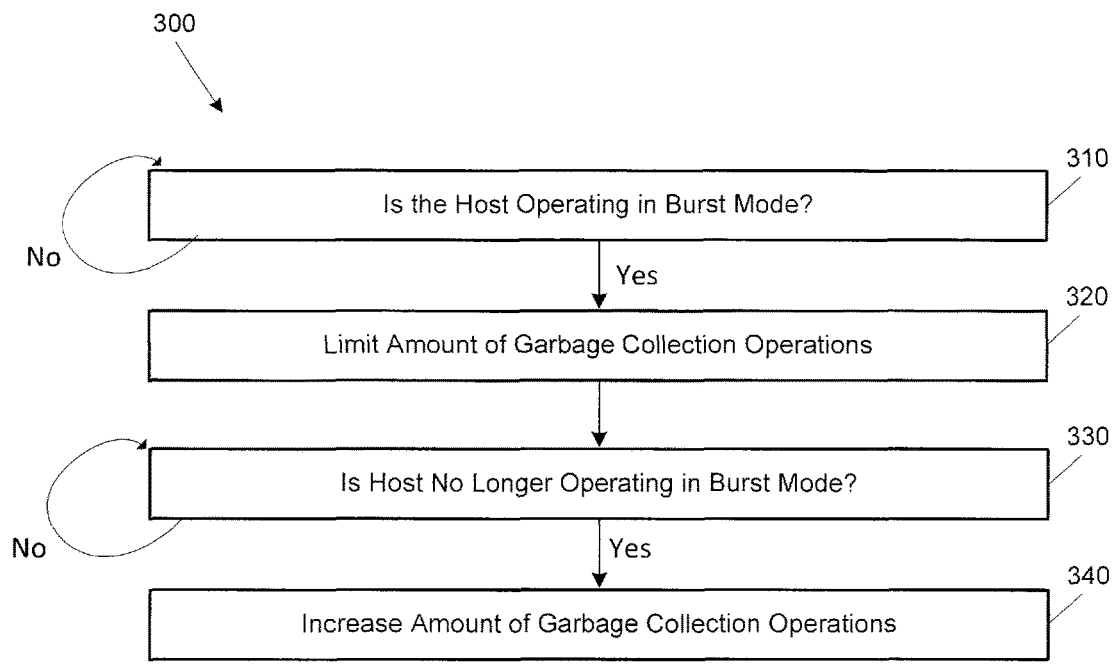
FIG. 3 is a flow chart of a method of an embodiment for regulating garbage collection operations based on write activity of a host.

Returning to the drawings, FIG. 3 is a flowchart 300 of a method that the processor 113 in the storage module 100 performs to regulate garbage collection operations based on write activity of the host. As shown in FIG. 3, the storage module 100 first determines if the host is operating in a burst mode (act 310). As used herein, a "burst mode" refers to a relatively-high load period by the host (i.e., a period in which the host is writing a relatively-high amount of data and/or issues a relatively-high number of write commands). That is, bursts are periods of time when a higher than average performance by the storage module 100 is required to satisfy the write activity of the host.

In order to determine whether the host is operating in a burst mode, the storage module 100 can determine if the write activity of the host over a time period exceeds a threshold. The write activity can be, for example, an amount of data received from the host to be written in the storage module 100 and/or a number of write commands received from the host (e.g., the number of input/output operations per second ("IOPS")). Write activity can take other forms, so the below claims should not be limited to these examples. However, it is preferred that the identification of a burst be done independent of the host. That is, the storage module 100 preferably determines whether the host is operating in a burst mode based on the write activity of the host and not by a message from the host indicating that it is operating in a burst mode (e.g., that the host buffer is full). Also, it is preferred that the time period over which the storage module 100 assesses whether there is a burst mode be small enough to enable fast detection of the burst mode (otherwise, unnecessary garbage collection may still be executed at the expense of transactions at the beginning of a burst, which will reduce performance) but large enough to eliminate noise in the detection. In one particular implementation, the time period is 100-200 msec; however, other time periods can be used. Additionally, the threshold against which to measure write activity can be static (an absolute number) (e.g., data being received from the host at a rate of 40 MB/sec and/or 200-2,000 write commands being received from the host over a 100-200 msec window) or dynamic (a relative number) (e.g., as a percentage based on previous write activity of the host (over the same or different time period) in a weighted or unweighted manner).

Returning to FIG. 3, in response to determining that the host is operating in the burst mode, the storage module 100 limits an amount of garbage collection operations during the burst mode (act 320). As discussed above, if the storage module 100 receives a write command while it is performing garbage collection, the storage module 100 typically would have to interrupt the garbage collection operation in order to execute the write command. However, this process can be a cause for additional latency and degradation in the user experience. Accordingly, when host is operating in burst mode, there is a higher amount of write activity than normal, and it is preferred to limit an amount of garbage collection operations during the burst mode to avoid this additional latency and degradation in the user experience. As used herein, "limiting an amount of garbage collection operations" can mean minimizing the number of garbage collection operations to a bare minimum (e.g., zero) during the burst period (thereby minimizing the risk of interruption). Alternatively, this can mean simply reducing the number of garbage collection operations that would otherwise have occurred. For example, if garbage collection is normally triggered after X number of blocks have been written, during burst mode, garbage collection can be still be triggered but only after 2X number of blocks have been written. Similarly, if garbage collection is normally triggered after the number of free blocks is under a threshold or after a percentage of valid data in written blocks is over a threshold, that threshold can be changed to decrease the number of garbage collection operations when the host is in burst mode. Again, by limiting an amount of garbage collection operations in this manner, the storage module 100 provides a higher-than-average performance and lower-latency during bursts than prior storage modules. (It should be noted that, in the prior approaches discussed above, that there is an in-progress garbage collection operation that is being interrupted. By limiting the amount of garbage collection operations to zero, there would be fewer (or no) garbage collection operation to interrupt.)

The storage module 100 can continue to operate in this manner until the storage module 100 determines that the host is no longer operating in burst mode (act 330). The storage module 100 can determine that the host is no longer operating in burst mode by comparing the write activity (e.g., the amount of data received from the host and/or the number of write commands received from the host over a time period) to a threshold. This threshold can be the same as the threshold used to determine whether the host was entering into the burst mode or can be different (i.e., the thresholds can "hysteresis," where the criteria for entering and exiting the burst mode is different). When the storage module 100 determines that the host is no longer in burst mode, the storage module 100 increases an amount of garbage collection operations (act 340). The storage module 100 can also increase an amount of garbage collection operations prior to this if the storage module 100 does not have enough free memory to satisfy a write command from the host (i.e., if the storage module 100 begins to suffer from lack of resources for internal data write management) or if the write activity is at the burst rate for a predetermined period of time (e.g., 10 seconds), which would indicate that the write activity is ongoing and not a "burst."

Increasing an amount of garbage collection after a burst period can simply mean returning to normal garbage collection activity (i.e., performing garbage collection when a trigger condition occurs). However, because garbage collection was limited during the burst period, it may be preferred to perform an even higher number of garbage collection operations to prepare for the next burst period (e.g., by increasing an amount of garbage collection over a baseline amount to prepare for a next burst period). This can be accomplished, for example, by using more generous triggering thresholds (e.g., triggering garbage collection after 0.5X blocks have been written instead of after X blocks have been written) or by performing garbage collection until a target number of free blocks has been achieved. Doing aggressive garbage collection during idle periods preceding burst periods provides a maximal amount of system resources for the burst period. The amount of resources to prepare for the next burst can be determined a-priori or according to actual statistics gathered over time. However, other than this intensive period, when the storage module 100 is not in the burst mode, the storage module 100 preferably limits garbage collection operations to avoid drawbacks associated with aggressive garbage collection. Such aggressive garbage collection may not be optimal from an endurance perspective since it may perform extra write and erase operations, some of which may be later determined to be not necessary. However, performing increased garbage collection during idle times of the storage module 100 will allow a greater amount of resources (i.e., more free memory) to be available during bursts. So, there may be a tradeoff between obtaining higher performance during bursts and reduced system endurance during idle times. Alternatively, the storage module 100 can have memory resources (e.g., dedicated single level cell ("SLC") blocks) reserved for use only in burst mode. This is in contrast to prior systems that may use the same resources for any write operation regardless if the write operation is part of a burst.

Because the storage module 100 may not be able to predict when the next burst period will occur, it, likewise, may not be able to predict when to perform aggressive garbage collection ahead of the burst period. As such, in one embodiment, the storage module 100 performs aggressive garbage collection immediate after it detects the host is no longer operating in burst mode. This is illustrated in FIG. 4.

Figure 4:
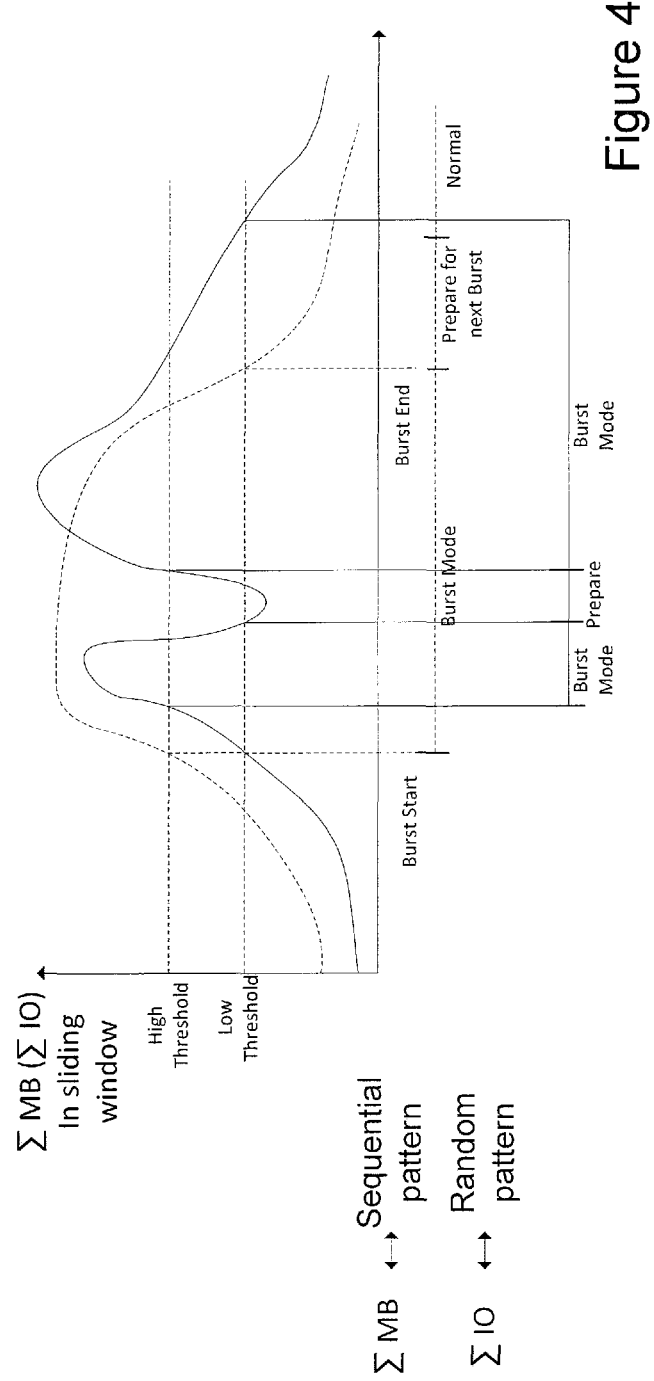
FIG. 4 is a graph showing how a storage module of an embodiment compares write activity of a host to determine when a host is entering and exiting a burst mode.

FIG. 4 shows two graphs—one in solid line and the other in dashed line. In this example, the "high threshold" is used to determine if the amount of data (MB) or the number of writes (IO) indicates the start of a burst period, while the "low threshold" determines whether the host is no longer operating in the burst mode. As can be seen from both graphs, after it is determined that the host is no longer in the burst mode, the storage module 100 prepares for the next burst mode by doing aggressive garbage collection. In the graph with the solid line, the preparation is cut short when another burst mode is detected. In the graph with the dashed line, the prepare continues until enough resources are prepared, at which time, the storage module 100 performs garbage collection operations according to its normal schedule.

In summary, because these embodiments regulate garbage collection operations based on write activity of a host rather than on synthetic benchmarks, these embodiments can provide better performance as compared to prior storage modules that use synthetic benchmarks. That is, these embodiments provide an optimization between system performance and system endurance by identifying (and anticipating) the burst mode periods based on real use-case parameters.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for regulating garbage collection operations based on write activity of a host, the method comprising:
performing the following in a storage module:
providing a time period of a duration that is large enough to eliminate noise in determining whether a host is operating in a burst mode and that is small enough to avoid unnecessary garbage collection;
determining that the host is operating in the burst mode by determining that write activity of the host over the time period exceeds a threshold, wherein the write activity comprises one or both of the following: (i) an amount of data received from the host to be written in the storage module and (ii) a number of write commands received from the host;
in response to determining that the host is operating in the burst mode, limiting an amount of garbage collection operations below a baseline amount during the burst mode;
determining that the host is no longer operating in the burst mode; and
in response to determining that the host is no longer operating in the burst mode, increasing an amount of garbage collection operations above the baseline amount to prepare for a next burst mode by performing one or both of the following: using more generous triggering thresholds than used for baseline garbage collection operations and performing garbage collection operations until a target number of free blocks has been achieved.

2. The method of claim 1, wherein the storage module determines that the host is operating in the burst mode only from write activity and not from a message from the host indicating burst mode.

3. The method of claim 1, wherein the write activity from the host comprises (i) but not (ii).

4. The method of claim 1, wherein the write activity from the host comprises (ii) but not (i).

5. The method of claim 1, wherein the write activity from the host comprises both (i) and (ii).

6. The method of claim 1, wherein the threshold is static.

7. The method of claim 1, wherein the threshold is dynamic.

8. The method of claim 7, wherein the dynamic threshold is based on previous write activity of the host.

9. The method of claim 1, wherein the storage module determines that the host is no longer operating in the burst mode by determining whether the write activity of the host falls below a second threshold.

10. The method of claim 9, wherein the threshold for determining that the host is operating in the burst mode is the same as the second threshold.

11. The method of claim 9, wherein the threshold for determining that the host is operating in the burst mode is different from the second threshold.

12. The method of claim 1, wherein the storage module increases an amount of garbage collection over a baseline amount to prepare for a next burst period.

13. The method of claim 1 further comprising increasing an amount of garbage collection operations if the storage module does not have enough free memory to satisfy a write command from the host.

14. The method of claim 1 further comprising increasing an amount of garbage collection operations if the write activity is at a sustained rate for a predetermined period of time.

15. The method of claim 1, wherein the storage module has memory blocks reserved for use only when the host is operating in the burst mode.

16. The method of claim 1, wherein the storage module is embedded in the host.

17. The method of claim 1, wherein the storage module and host are separate devices that are configured to removably connect to one another.

18. A storage module comprising:
a memory; and
a processor in communication with the memory, wherein the processor is configured to:
provide a time period of a duration that is large enough to eliminate noise in determining whether a host is operating in a burst mode and that is small enough to avoid unnecessary garbage collection;
determine that the host is operating in the burst mode by determining that write activity of the host over the time period exceeds a threshold, wherein the write activity comprises one or both of the following: (i) an amount of data received from the host to be written in the storage module and (ii) a number of write commands received from the host;
in response to determining that the host is operating in the burst mode, limit an amount of garbage collection operations below a baseline amount during the burst mode;
determine that the host is no longer operating in the burst mode; and
in response to determining that the host is no longer operating in the burst mode, increase an amount of garbage collection operations above the baseline amount to prepare for a next burst mode by performing one or both of the following: using more generous triggering thresholds than used for baseline garbage collection operations and performing garbage collection operations until a target number of free blocks has been achieved.

19. The storage module of claim 18, wherein the storage module determines that the host is operating in the burst mode only from write activity and not from a message from the host indicating burst mode.

20. The storage module of claim 18, wherein the write activity from the host comprises (i) but not (ii).

21. The storage module of claim 18, wherein the write activity from the host comprises (ii) but not (i).

22. The storage module of claim 18, wherein the write activity from the host comprises both (i) and (ii).

23. The storage module of claim 18, wherein the threshold is static.

24. The storage module of claim 18, wherein the threshold is dynamic.

25. The storage module of claim 24, wherein the dynamic threshold is based on previous write activity of the host.

26. The storage module of claim 18, wherein the storage module determines that the host is no longer operating in the burst mode by determining whether the write activity of the host falls below a second threshold.

27. The storage module of claim 26, wherein the threshold for determining that the host is operating in the burst mode is the same as the second threshold.

28. The storage module of claim 26, wherein the threshold for determining that the host is operating in the burst mode is different from the second threshold.

29. The storage module of claim 18, wherein the storage module increases an amount of garbage collection over a baseline amount to prepare for a next burst period.

30. The storage module of claim 18, wherein the processor is further configured to increase an amount of garbage collection operations if the storage module does not have enough free memory to satisfy a write command from the host.

31. The storage module of claim 18, wherein the processor is further configured to increase an amount of garbage collection operations if the write activity is at a sustained rate for a predetermined period of time.

32. The storage module of claim 18, wherein the storage module has memory blocks reserved for use only when the host is operating in the burst mode.

33. The storage module of claim 18, wherein the storage module is embedded in the host.

34. The storage module of claim 18, wherein the storage module and host are separate devices that are configured to removably connect to one another.

35. A method for regulating garbage collection operations based on write activity of a host, the method comprising:
performing the following in a storage module:
providing a time period of a duration that is large enough to eliminate noise in determining whether a host is operating in a burst mode and that is small enough to avoid unnecessary garbage collection;
determining that the host is operating in the burst mode by determining that write activity of the host over the time period exceeds a threshold;
in response to determining that the host is operating in the burst mode, limiting an amount of garbage collection operations below a baseline amount during the burst mode;
determining that the host is no longer operating in the burst mode; and
in response to determining that the host is no longer operating in the burst mode, increasing an amount of garbage collection operations above the baseline amount to prepare for a next burst mode by performing one or both of the following: using more generous triggering thresholds than used for baseline garbage collection operations and performing garbage collection operations until a target number of free blocks has been achieved.

36. A storage module comprising:
a memory;
means for determining that a host is operating in a burst mode by determining that write activity of the host over a time period exceeds a threshold, wherein the time period is of a duration that is large enough to eliminate noise in the determining and that is small enough to avoid unnecessary garbage collection;
means for in response to determining that the host is operating in the burst mode, limiting an amount of garbage collection operations below a baseline amount during the burst mode;
means for determining that the host is no longer operating in the burst mode; and
means for in response to determining that the host is no longer operating in the burst mode, increasing an amount of garbage collection operations above the baseline amount to prepare for a next burst mode by performing one or both of the following: using more generous triggering thresholds than used for baseline garbage collection operations and performing garbage collection operations until a target number of free blocks has been achieved.

* * * * *